March 14, 1950   R. KELLER   2,500,548
ACCELERATION METER
Filed Aug. 29, 1945

Inventor:
Robert Keller,
By Pierce & Scheffler,
Attorneys.

Patented Mar. 14, 1950

2,500,548

UNITED STATES PATENT OFFICE 2,500,548

ACCELERATION METER

Robert Keller, Ennetbaden, Switzerland, assignor to Aktiengesellschaft Brown, Boveri & Cie, Baden, Switzerland, a joint-stock company of Switzerland Application August 29, 1945, Serial No. 613,353
In Switzerland September 6, 1944

1 Claim. (Cl. 175—183)

This invention relates to acceleration meters and more particularly to devices or circuits for the electrical measurement of acceleration.

The known swinging weight type of apparatus for the measurement of the acceleration of a rotating shaft operates with certain lag or time delay that gives rise to a substantial "hunting" or speed variation when the mechanical accelerometer is employed in a control system for maintaining an approximately constant rotary speed. The prior electrical devices for measuring a frequency variation corresponding to acceleration have usually included a capacitive and an inductive circuit fed from an alternating current network and each working into a full wave rectifier, the output circuits of the rectifiers being connected in opposition to a measuring instrument or control device to which they deliver a voltage that varies with the rate of frequency change and is independent of the voltage variations in the alternating current network.

Objects of the present invention are to provide acceleration meters or accelerometers of the electrical type that are more sensitive and at the same time much simpler than the prior electrical accelerometers. Another object is to provide an accelerometer of the electrical type in which the terminal voltage developed upon a change in the frequency of the primary alternating current network is a more than linear function of the change in frequency. Another object is to provide an electrical accelerometer of the general type in which an alternating current generator is driven by a shaft and the acceleration of the shaft is measured in terms of variations in the frequency of the generator output, and more particularly to compensate in such an accelerometer for the voltage change that arises from a change in the speed of the shaft.

Figure 1:
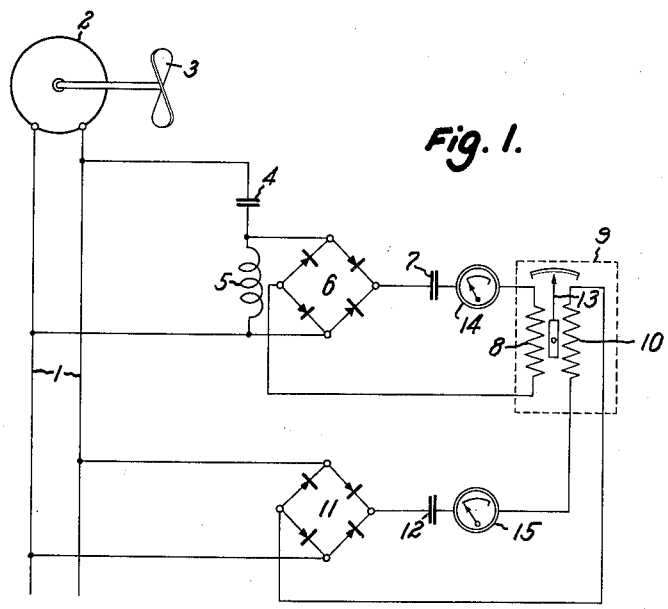
Figure 2:
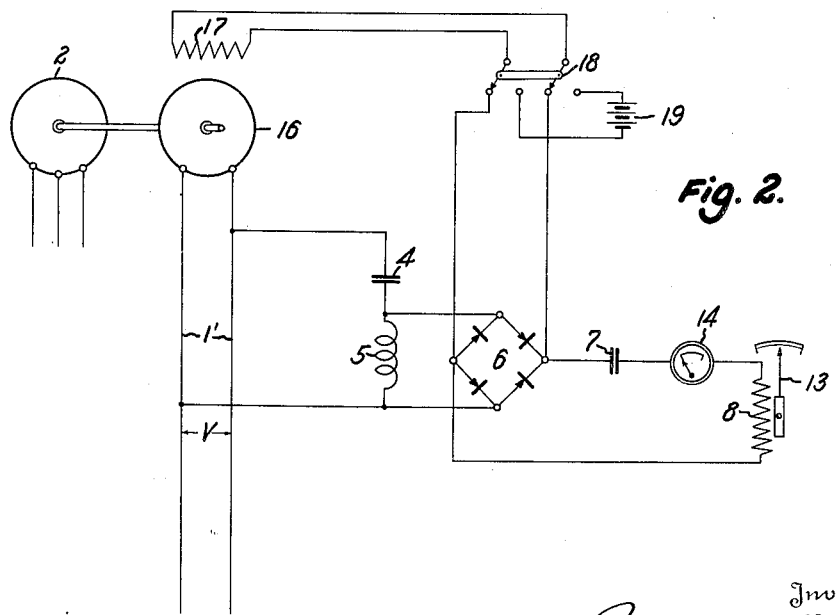

These and other objects and advantages will be apparent from the following specification when taken with the accompanying drawing in which Figs. 1 and 2 are circuit diagrams of different embodiments of the invention.

Referring particularly to Fig. 1, the reference numeral 1 identifies two conductors of a single phase alternating current circuit or of a multiphase circuit energized by an alternating current generator 2 driven by a prime mover that may be a steam or water turbine that is indicated schematically by the turbine wheel 3. Alternatively, the generator 2 may be an auxiliary generator that is driven by any appropriate means or mechanism to develop an alternating current that varies in frequency and in voltage with the speed of the shaft whose mechanical acceleration is to be measured. A circuit of mixed reactance comprising a capacitor 4 in series with an inductance 5 is connected across the line 1, 1 and a full wave rectifier 6 is connected across the inductance 5. The output circuit of the rectifier bridge includes a capacitor 7 in series with the main coil 8 of an acceleration meter or accelerometer 9. The meter 9 has a voltage-change compensating coil 10 in the output circuit of a full wave rectifier that is connected across the leads 1, 1 from the generator 2. A condenser 12 is interposed between the coil 10 and the bridge 11. The pointer 13 of the meter moves over a suitably graduated scale in accordance with the differential current outputs $I_1$ and $I_2$ of the rectifier bridges 6 and 11, respectively, that may be indicated, if desired, by meters 14, 15 in series with the meter coils 8 and 10, respectively.

Upon acceleration of the machine or turbine 3, a corresponding acceleration of the generator 2 takes place and there is a corresponding change in the frequency with which the conductors 1 are energized. Consequently a change occurs in the direct current voltage at the output terminals of the rectifier 6. This change in voltage is applied through the capacitor 7 to the main coil 8 of the accelerometer 9 in the form of the current $I_1$. However, the magnitude of the current $I_1$ is influenced not only by the change in frequency applied to the conductors 1 but also by the change in voltage resulting from the change in speed of the generator 2.

The effect of the voltage change is eliminated by the current $I_2$ in coil 10 which changes only in accordance with change in voltage applied to conductors 1 and is independent of the change in frequency since the rectifier 11 is energized directly from the conductors 1 without the interposition of reactive impedance. As a result, the pointer 13 moves only in accordance with the change in frequency resulting from change in speed of the shaft whose mechanical acceleration is to be measured.

In the measuring circuit of Fig. 2, the voltage compensating circuit of Fig. 1 is omitted and the leads 1', 1' across which the measuring circuit is connected are energized by an alternating voltage V developed by an auxiliary alternating current generator comprising a rotor 16 on the shaft of the alternating current generator 2 and a field winding 17. A double throw switch 18 is provided for connecting the field winding 17 across a battery 19 for starting and across the bridge 6 during normal operation. The acceleration meter comprises a single coil 8 for displacing the pointer 13 in accordance with the current I that is delivered by the rectifier bridge, through the capacitor 7, to the coil 8. The reason for connecting the field winding 17 to the battery 19 during starting is, of course, to obtain a voltage V from the generator 16 which is proportional to the frequency from the initial starting movement of the generator until it reaches normal rated speed. This linear voltage-frequency relationship is possible only when the generator 16 is separately excited when starting up, and switch 18 should be shifted for self-excitation of the field winding from the rectifier 6 only when the generator has reached full or approximately full rated speed.

The value of current I is given by the equation:

$$I = C\frac{dV}{dt}$$

where C is a constant. Since $V=K\omega$, where K is another constant, it follows that $$I = K'\frac{d\omega}{dt}$$

where K' is another constant, when the condenser 7 is fed with a voltage proportional to the speed. Due to the fact that the rectifier 6 is connected across an inductor 5 in series with a condenser 4, the accelerometer is very sensitive to frequency since, when the frequency of the alternating current changes, the voltage change in the capacitor 7 is several times as great as the change in the generator output voltage V.

For simplicity of illustration, the acceleration measuring device has been shown as an indicating meter but it is to be understood that it may be an instrument type relay, with stationary contacts cooperating wth the pointer 13, for inclusion in a system for regulating the speed of the prime mover that drives the alternating current generator 2. Other changes that may occur to those familiar with the design and construction of electrical accelerometers fall within the spirit of my invention as set forth in the following claim.

I claim:

An acceleration meter comprising an alternating current generator having a field winding, impedance means including reactances of opposite types in series across said generator, full wave rectifying means having input terminals connected across a reactance of one type of said impedance means and having output terminals across which a direct current voltage is developed, whereby upon a frequency change of the generator output the change in the output voltage of said rectifying means is more than proportional to the frequency change, an output circuit for said rectifying means including a capacitor in series with current-responsive measuring means, and switch means for connecting said field winding to a direct current source during starting and across said output terminals of said rectifying means during operation.

ROBERT KELLER.

REFERENCES CITED

The following references are of record in the file of this patent:

UNITED STATES PATENTS

| Number | Name | Date |
| --- | --- | --- |
| 1,096,942 | Owens | May 19, 1914 |
| 1,809,683 | Fitzgerald | June 9, 1931 |
| 1,902,496 | Fitzgerald | Mar. 21, 1933 |
| 2,017,894 | Cady | Oct. 22, 1935 |
| 2,092,366 | Baughman | Sept. 7, 1937 |
| 2,208,738 | Hines | July 23, 1940 |
| 2,301,115 | Gilbert | Nov. 3, 1942 |